July 5, 1927.　　　　　J. ROBINSON　　　　　1,634,851
AUTOMATIC TRAIN PIPE CONNECTER
Original Filed Oct. 18, 1921　　2 Sheets-Sheet 1

Witness:
E.H.Wagner

Inventor
Joseph Robinson
By J.H.Robb
Attorney

July 5, 1927.
J. ROBINSON
1,634,851
AUTOMATIC TRAIN PIPE CONNECTER
Original Filed Oct. 18, 1921   2 Sheets-Sheet 2
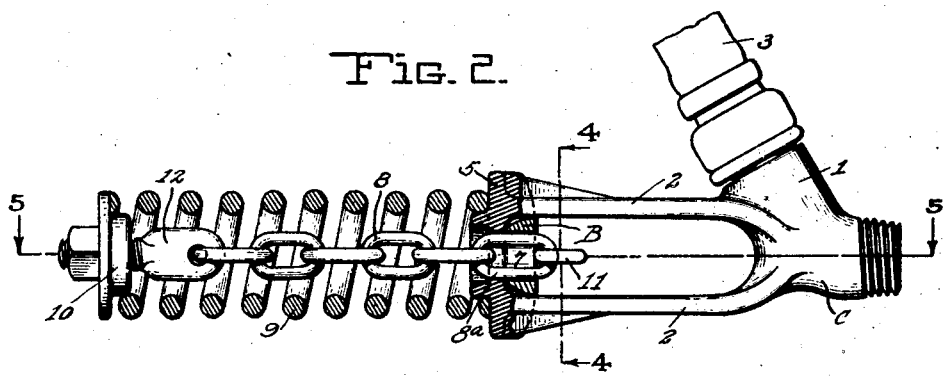
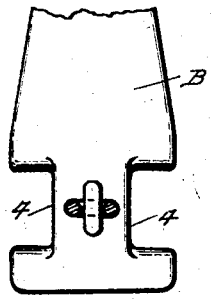
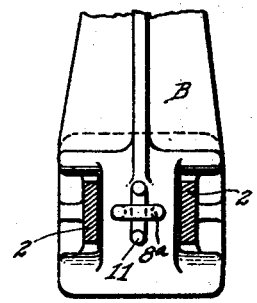
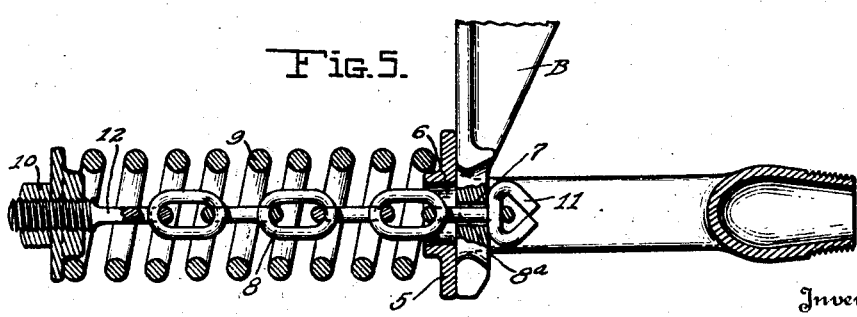
Witness:
C. H. Wagner.
Inventor
Joseph Robinson
By
Attorney Patented July 5, 1927.

1,634,851

UNITED STATES PATENT OFFICE.

JOSEPH ROBINSON, OF NEW YORK, N. Y.

AUTOMATIC TRAIN-PIPE CONNECTER.

Application filed October 18, 1921, Serial No. 508,582. Renewed December 13, 1926.

This invention appertains to train pipe connecters of a type developed by me heretofore, and comprising primarily these essential parts, i. e., a supporting bracket, a coupling member and its coupling head, a buffer spring, and tying means for cooperation with the bracket and spring to tie or secure the coupling member in its working position relatively to the bracket.

The novelty residing in the present improvements has to do with the form and application of the tie member which cooperates with the bracket and spring to hold the coupling means in its normal aligned position for coupling action. Long experience in the development of train pipe connecters demonstrates that several important factors must be borne in mind in the design of a practicable connecting device of this type. The propositions of fewness of parts and simplicity of construction are important; there is an absolute necessity for substantially universal movement in the mounting of the coupling parts proper upon their supporting bracket; and readiness of application, adjustment, and removal of the parts are essential, not to mention certain other requisites which have no bearing upon the present invention, however.

With the foregoing in mind, I have designed a special tie member for connecting the coupling means proper with the bracket, in proper relation to the buffer spring, the function of which is well known, which tie means is conducive to the simplicity of my construction in that it is composed of a body made up of chain links, something always available for purposes of repairs, if necessary, and having the additional quality of being flexible as as to avail of such action in the movement of the connecter under actual conditions of service. I utilize the tie member in conjunction with a peculiar bearing element adapted to engage the bracket and really forming an end member of the tie means, the latter being equipped with a spring engaging bearing nut at its other end. By reason of the peculiar form and connection of the tie means with the bracket and with the bearing element which engages the bracket, the portions of the tie means in direct contact with the bracket, as well as said bearing element, are stationary, though the main body portion of the tie means is capable of movement relatively to the bracket as an incident to the various shifting movements of the coupling member and its head, both when coupled and in the operation of coupling.

A thorough understanding of the construction of my connecter, and the merits of the peculiar operation thereof incident to the use of my novel tie means, will be had upon consulting the following detailed description and concluding claims, in conjunction with the accompanying drawings in which:

Figure 2 is a horizontal sectional view through the main parts of the connecter, the coupling head omitted.

Figure 3 is a fragmentary view of the bracket showing more clearly the manner in which the tie means, illustrated in section, are applied thereto.

Figure 4 is a vertical section on the line 4—4 of Figure 2 and

Figure 5 is a vertical section on the line 5—5 of Figure 2.

Figure 1:
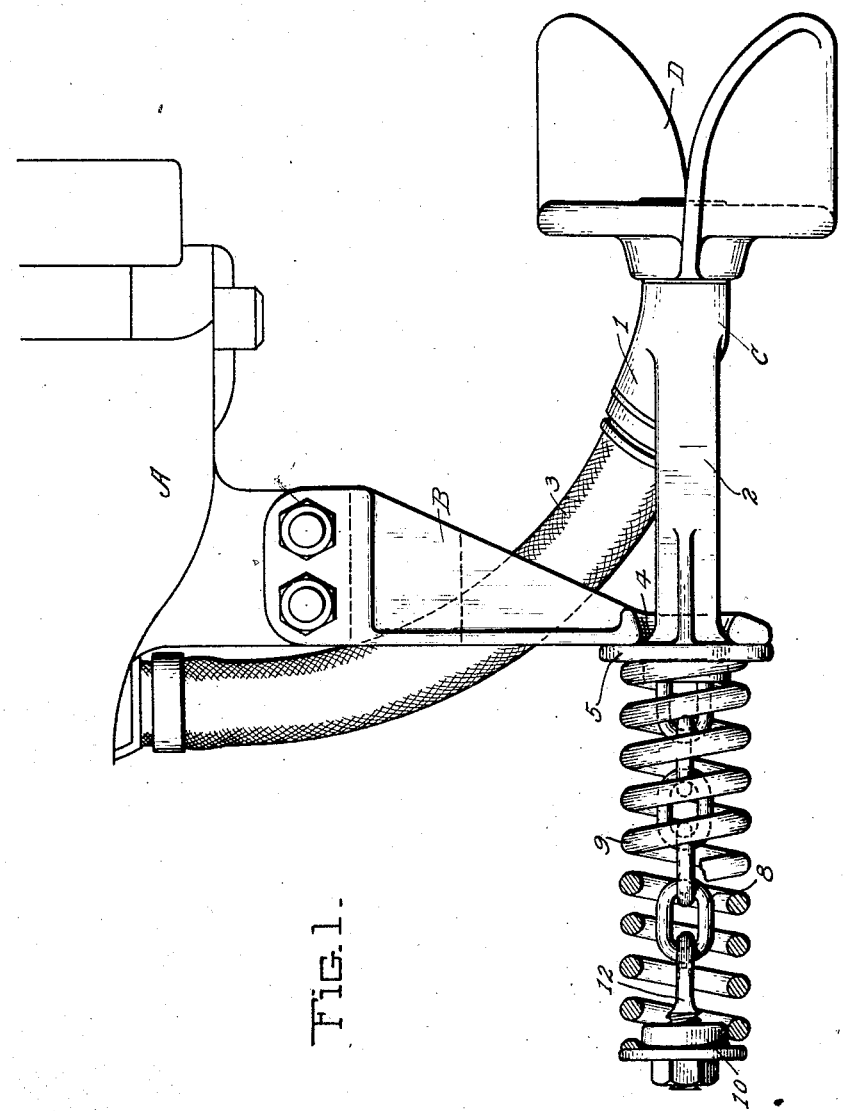
Figure 1 is a side view showing one preferred type of my connecter utilizing the improvements of the present invention.

The main parts of my connecter, as illustrated, are of a well known form designed by me and including primarily the supporting bracket B, preferably mounted upon the coupler A of a car, the connecter parts proper being carried by the lower end of the bracket B. The said connecter parts include the coupling member C having the head D at one end, the body of the coupling member comprising the pipe 1 and the spaced horizontal sides or straps 2. A train pipe 3 is shown connected to the pipe 1 and consists of a conventional form of flexible conduit. At its lower end, the bracket B has the side notches 4, seen best in Figures 3 and 4, and the sides or straps 2 of the coupling member C are adapted to slide in said notches, the member C being supported from downward displacement by the lower walls of the notches 4, in a self-evident manner. At its rear extremity, the coupling member C is formed with an abutment 5 adapted to engage the rear face of the bracket B, and having an opening 6 therein. Coincident with the opening 6 of the abutment 5 is a slot 7 in the lower end of the bracket, the said slot being horizontally disposed and having a portion of the tie member 8 passing therethrough and disposed therein.

Seated against the rear face of the abutment 5 is the buffer spring 9, and the said spring is held in place by the tie member 8 through the provision of the bearing and adjusting nut 10 and the bearing element 11, the former engaging the rear extremity of the spring, and the latter engaging the front face of the bracket B.

As before premised, the tie member 8 is made up of links, or in other words, consists of a chain length, the bearing element 11 being a loop passing through the front stationary link 8$^a$ of the tie member 8, the sides of said loop being squeezed together to prevent its accidental displacement. The rear end of the tie member is connected with the nut 10 by an eye bolt 12, through the eye of which is engaged the rearmost link of the tie member. Said eye bolt is preferably flattened at its front portion so as to be readily engaged by a spanner wrench by which it may be held when it is desired to rotate the nut 10 for adjustment or removal.

The foregoing presents in brief the construction and relations of the various parts of my improved connecter. The mounting of the coupling member is such that normally the bearing of the element 11 upon the front face of the bracket, and the bearing of the abutment 5 upon the rear face of the bracket, are maintained by the spring 9 and tie member 8. The relations of the several parts are such that a universal movement of the coupling member, and slight incidental sliding movement of the sides 2, in the notches 4 of the bracket B, are readily permitted, the universal movement being requisite for the proper operation of the connecter. During any such universal or other movement, it will be evident that the element 11 maintains its stationary bearing against the front face of the bracket, and the link 8$^a$ of the tie member 8 remains substantially stationary, notwithstanding that the other portions of the tie member 8 may move as a unit relatively to the bracket, and to the parts 8$^a$ and 11. Therefore, it will be clear that the tie member is provided with means by which it is afforded a substantially stationary though separable bearing at its point of connection with the bracket, a feature which is of special advantage in apparatuses of the type of this invention. The readiness with which the tie member 8, and bearing element 11 may be emplaced, removed, replaced and repaired, will be obvious in view of the foregoing, and the construction of the tie member is conducive to a very considerable simplification as regards the general arrangement and form of the parts of my connecter, especially in relation to the mode of attaching the tie member to the bracket by frictionless means, as set forth.

Having thus described my invention, what I claim as new is:

1. In a train pipe connecter, in combination, a supporting bracket, a coupling member mounted thereon for universal movement, a buffer spring co-acting with the coupling member and at one side of the bracket to normally hold said member in coupling alignment position on the bracket and permit yielding and other movements thereof, and tying means to connect the bracket and spring together, consisting of a flexible tie member engaging the spring at one end and passing through the bracket to the side opposite the spring, and a removable bearing element connecting said tie member to the bracket, located on the last mentioned side of the bracket, and forming a bearing for the tie member stationary relatively to the bracket, the coupling member comprising spaced sides between which the bearing element is accessible from lateral directions to facilitate application and removal thereof.

2. In a train pipe connecter, the combination with a support, a coupling member mounted thereon and adapted for universal movement relative thereto, a buffer spring cooperative with the coupling member and at one side of the support, means for tying the spring to the support in proper cooperation with the coupling member to normally maintain the latter in position for coupling operation, comprising a bearing element having a stationary bearing against the support at the side opposite that at which the spring is located, and a chain section connected with said bearing element and having a portion thereof passing through said bracket.

3. In a train pipe connecter, the combination with a bracket, a coupling member mounted thereon and adapted for universal movement relatively thereto, a buffer spring cooperative with the coupling member, means for tying the spring to the bracket in proper cooperation with the coupling member to normally maintain the latter in position for coupling operation, comprising a bearing element having a stationary bearing against the bracket, and a chain section connected with said bearing element and having a portion thereof passing through said bracket, the portion of the chain section passing through the bracket being stationary relative to the latter and relative to the bearing element.

4. In a train pipe connecter of the class described, a bracket, coupling member and buffer spring assembly comprising a supporting bracket, a coupling member adapted for universal movement on the bracket and a buffer spring connected to the bracket and coupling member, the connection for the said parts comprising a tie member in the form of a chain section having a bearing against the spring, and a bearing element engaging with the bracket to secure the tie member thereto and displaceable from the bracket, said bearing element having a bearing against said bracket which is stationary during normal operation of the coupling member.

5. In a train pipe connecter of the class described, a bracket, coupling member and buffer spring assembly comprising a supporting bracket, a coupling member adapted for universal movement on the bracket and a buffer spring connected to the bracket and coupling member, the connection for the said parts comprising a tie member having a bearing against the spring, and a detachable bearing element co-acting with the bracket to secure the tie member thereto and having a stationary bearing against said bracket at the side opposite the spring, the coupling member being equipped with an abutment engaged by the other end of the spring and engaging the rear face of the bracket while the bearing element engages the front face of the said bracket, and the tie member having a portion thereof passing through said abutment and through said bracket.

6. In a train pipe connecter, a supporting bracket, a coupling member mounted on the lower portion of said bracket for universal movement and engaged with the bracket to prevent downward displacement of said coupling member, the coupling member having an abutment at one end engaging the bracket at one side thereof, a spring bearing against said abutment to maintain it in cooperation with the bracket, tie means comprising a chain section having bearing means at one end cooperating with the spring at one side of the bracket, passing through the bracket to the other side, and a bearing element at the other end of said chain section cooperating with the bracket at the last mentioned side and having there a normally stationary bearing against the latter.

7. In a train pipe connecter, a supporting bracket, a coupling member mounted on the lower portion of said bracket for universal movement and engaged with the bracket to prevent downward displacement of said coupling member, the coupling member having an abutment at one end engaging the bracket at one side thereof, a spring bearing against said abutment to maintain it in cooperation with the bracket, tie means comprising a chain section having bearing means at one end cooperating with the spring at one side of the bracket, and a bearing element at the other end of said chain section and the last mentioned side of the bracket and cooperating with the bracket and a normally stationary loop engaging the chain section and bearing against the bracket at the side opposite the spring, the chain section having a link passing through the bracket and through said abutment of the coupling member and held relatively stationary by and respecting the bracket and having said loop engaged with said link.

8. In a train pipe connecter, in combination, a supporting bracket, a coupling member mounted thereon for universal movement, a buffer spring co-acting with the coupling member and at one side of the bracket to normally hold said member in coupling alignment position on the bracket and permit yielding and other movements thereof, and tying means to connect the bracket and spring together, consisting of a flexible tie member engaging the spring at one end and passing through the bracket to the side opposite the spring, and a removable bearing element connecting said tie member to the bracket, located on the last mentioned side of the bracket, and forming a stationary bearing for the tie member relatively to the bracket.

JOSEPH ROBINSON.